(12) United States Patent
Lou

(10) Patent No.: US 11,687,121 B2
(45) Date of Patent: Jun. 27, 2023

(54) PRESSURE SENSITIVE ASSEMBLY, MIDDLE FRAME ASSEMBLY, DISPLAY ASSEMBLY AND TERMINAL

(71) Applicant: BEIJING XIAOMI MOBILE SOFTWARE CO., LTD., Beijing (CN)

(72) Inventor: Chunjie Lou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 14 days.

(21) Appl. No.: 17/242,248

(22) Filed: Apr. 27, 2021

(65) Prior Publication Data
US 2022/0066514 A1 Mar. 3, 2022

(30) Foreign Application Priority Data
Aug. 31, 2020 (CN) .......................... 202010895743.5

(51) Int. Cl.
*G06F 1/16* (2006.01)
(52) U.S. Cl.
CPC .......... *G06F 1/1656* (2013.01); *G06F 1/1626* (2013.01); *G06F 1/1684* (2013.01)
(58) Field of Classification Search
CPC .... G06F 1/1656; G06F 1/1626; G06F 1/1684; G06F 2203/04105; G06F 1/1643; G06F 1/1652; G06F 1/3215; G06F 1/3265; G06F 1/3287; G06F 2200/1636; H04M 2250/12; H04M 1/026; H04M 1/0266
See application file for complete search history.

(56) References Cited

U.S. PATENT DOCUMENTS

| 11,169,568 B2* | 11/2021 | Lee ....................... G06F 1/1601 |
| 2016/0299527 A1 | 10/2016 | Kwak et al. |
| 2017/0047351 A1* | 2/2017 | Kwon ................... G06F 3/0483 |
| 2018/0188874 A1* | 7/2018 | Cho ......................... G01L 1/18 |
| 2018/0275719 A1 | 9/2018 | Kwak et al. |
| 2019/0302843 A1 | 10/2019 | Kwak et al. |
| 2019/0317553 A1* | 10/2019 | Cho ........................ G09F 9/302 |
| 2020/0042043 A1* | 2/2020 | Lee ....................... G06F 1/1643 |
| 2020/0057522 A1 | 2/2020 | Hong et al. |
| 2020/0201503 A1* | 6/2020 | Lee ........................... G01L 1/146 |
| 2020/0363838 A1 | 11/2020 | Kwak et al. |

(Continued)

FOREIGN PATENT DOCUMENTS

| CN | 110572492 A | 12/2019 |
| EP | 3079033 A1 | 10/2016 |

OTHER PUBLICATIONS

European Search Report in the European Application No. 21169638.0, dated Oct. 19, 2021, (7p).

*Primary Examiner* — Rockshana D Chowdhury
(74) *Attorney, Agent, or Firm* — Arch & Lake LLP

(57) ABSTRACT

A pressure sensitive assembly, a middle frame assembly, a display assembly, and a terminal are provided. The pressure sensitive assembly is applied to a display screen having a curved surface, and the display screen is mounted on the middle frame. The pressure sensitive assembly includes a support component including a connection surface and a support surface. The connection surface is fixedly connected with the middle frame. The support surface is disposed facing the curved surface, A pressure sensing circuit is disposed between the support surface and the curved surface. The pressure sensing circuit senses a pressing force applied to the curved surface.

7 Claims, 6 Drawing Sheets

(56) References Cited

U.S. PATENT DOCUMENTS

| | | |
|---|---|---|
| 2021/0042004 A1 | 2/2021 | Lee et al. |
| 2021/0117033 A1 | 4/2021 | Hong et al. |
| 2021/0143362 A1* | 5/2021 | Baek .................. H10K 59/40 |
| 2022/0043486 A1* | 2/2022 | Choi .................. G06F 1/1652 |

* cited by examiner ions expressed in the following description do not represent all embodiments consistent with the present disclosure. On the contrary, they are merely examples of apparatuses and methods consistent with some aspects of the present disclosure as detailed in the appended claims.

PRESSURE SENSITIVE ASSEMBLY, MIDDLE FRAME ASSEMBLY, DISPLAY ASSEMBLY AND TERMINAL

CROSS-REFERENCE TO RELATED APPLICATION

This application is based on and claims priority to Chinese Patent Application No. 202010895743.5, filed on Aug. 31, 2020, the contents of which are hereby incorporated by reference in its entirety for all purposes.

TECHNICAL FIELD

The present disclosure relates to the technical field of terminal, and in particular to a pressure sensitive assembly, a middle frame assembly, a display assembly, and a terminal.

BACKGROUND

With the continuous progress of technology, terminal devices are constantly updated. Taking mobile phones as an example, curved-screen phones with a larger screen-to-body ratio make more technological sense.

In the related art, in order to increase the ratio of the curved screen, the original mechanical buttons are replaced by the pressure sensitive assembly. For example, the pressure sensitive assembly is disposed below the screen or inside the middle frame. When in use, the pressing pressure from the finger is applied to the response area of the pressure sensitive assembly, and the pressure sensitive assembly realizes a corresponding key function according to the sensed pressing pressure.

However, the above-mentioned pressure sensitive assembles are in contact with a flat surface and can only achieve pressure sensing on the flat surface, which has certain limitations.

SUMMARY

In order to address deficiencies in the related art, the present disclosure provides a pressure sensitive assembly, a middle frame assembly, a display assembly, and a terminal.

According to a first aspect of the present disclosure, a pressure sensitive assembly is provided. The display screen may have a curved surface and may be mounted on a middle frame. The pressure sensitive assembly includes a support component including a connection surface and a support surface. The connection surface is fixedly connected with the middle frame. The support surface is disposed facing the curved surface A pressure sensing circuit disposed between the support surface and the curved surface. The pressure sensing circuit senses a pressing force applied to the curved surface.

According to a second aspect of the present disclosure, a middle frame assembly is provided. The middle frame assembly includes a middle frame for supporting a display screen. The display screen includes a curved surface. The pressure sensitive assembly includes a support component that includes a connection surface and a support surface. The connection surface is fixedly coupled connected with the middle frame. The support surface is disposed facing the curved surface. The at least one pressure sensing circuit component disposed between the support surface and the curved surface. The pressure sensing circuit senses a pressing force applied to the curved surface. The pressure sensitive assembly is disposed on the curved surface and fixedly coupled connected with the middle frame.

According to a third aspect of the present disclosure, a display assembly is provided. The display assembly includes a display screen. The middle frame assembly includes a middle frame for supporting the display screen. The display screen includes a curved surface and a pressure sensitive assembly. The pressure sensitive assembly includes a support component including a connection surface and a support surface. The connection surface is fixedly coupled connected with the middle frame, and the support surface is disposed facing the curved surface. The at least one pressure sensing circuit component is disposed between the support surface and the curved surface. The pressure sensing circuit senses a pressing force applied to the curved surface. The pressure sensitive assembly is disposed on the curved surface and fixedly coupled connected with the middle frame.

It should be understood that the foregoing general description and the later detailed description are exemplary and explanatory only and do not limit the present disclosure.

BRIEF DESCRIPTION OF THE DRAWINGS

The accompanying drawings, which are incorporated in and constitute a part of the description, illustrate embodiments consistent with the present disclosure and are used together with the description to explain the principles of the present disclosure.

DETAILED DESCRIPTION

Figure 1A:
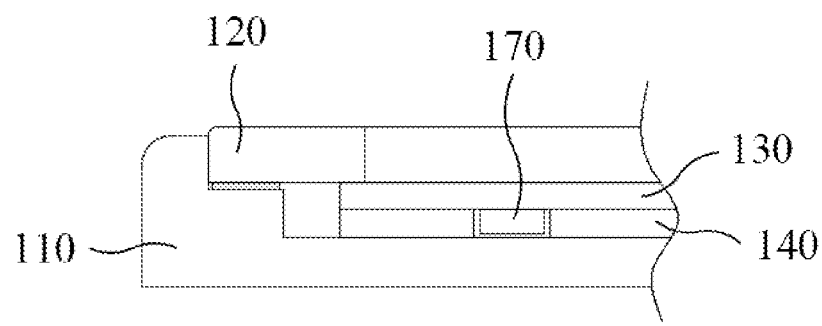
FIG. 1A is a schematic diagram of a display assembly in the related art, according to an example of the present disclosure.

Exemplary embodiments will be described in detail herein, examples of which are illustrated in the accompanying drawings. When the following description refers to the drawings, the same reference numeral in different drawings indicates the same or similar elements unless otherwise indicated. The embodiments described in the following exemplary embodiments do not represent all embodiments consistent with the present disclosure. Rather, they are merely examples of devices and methods that are consistent with some aspects of the disclosure, as detailed in the appended claims.

Figure 1B:
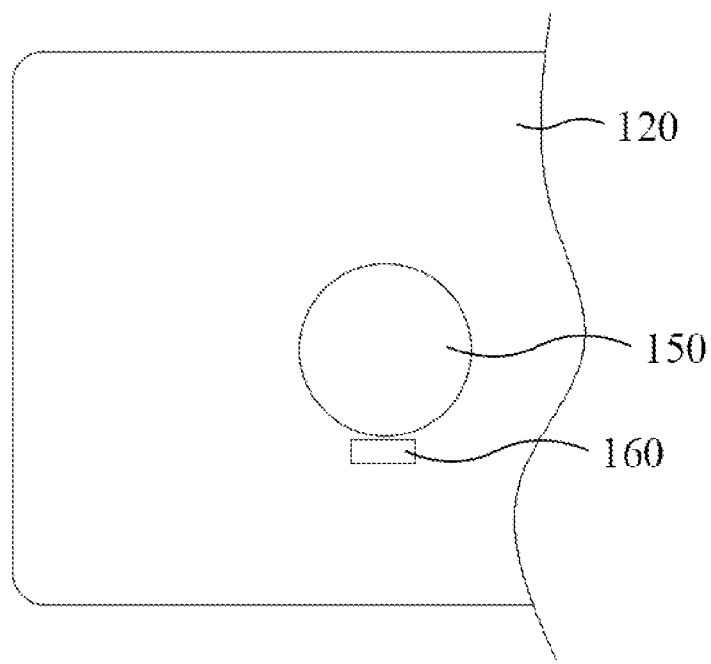
FIG. 1B is a partial top view of the display assembly shown in FIG. 1A, according to an example of the present disclosure.

FIG. 1A is a schematic diagram of a display assembly in the related art. FIG. 1B is a partial top view of the assembly shown in FIG. 1A.

As shown in FIGS. 1A and 1B, the display assembly includes a middle frame 110 and a display screen mounted on the middle frame 110. The display screen includes a glass cover plate 120 and a display assembly. The display assembly includes a display panel 130 and a protective layer 140 in contact with a back surface of the display panel 130. A fingerprint assembly 170 and a pressure sensing component 160 are also provided between the display panel and the middle frame 110. The fingerprint assembly 170 is provided with a fingerprint identification area 150 on the display screen. When the display screen needs to be unlocked, a finger presses the fingerprint identification area 150 on the display screen. When the pressure sensing component 160 senses the pressing pressure, a pressure signal is generated to trigger the display screen to light up and the fingerprint assembly 170 to perform fingerprint identification.

Figure 2A:
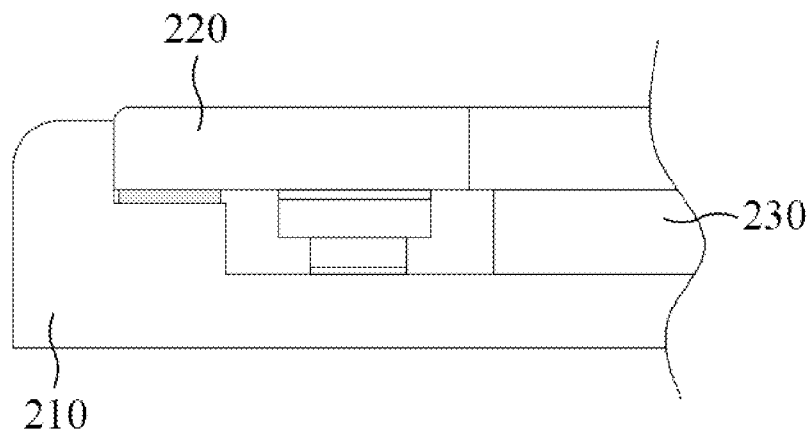
FIG. 2A is a schematic diagram of a display assembly in another related art, according to an example of the present disclosure.
Figure 2B:
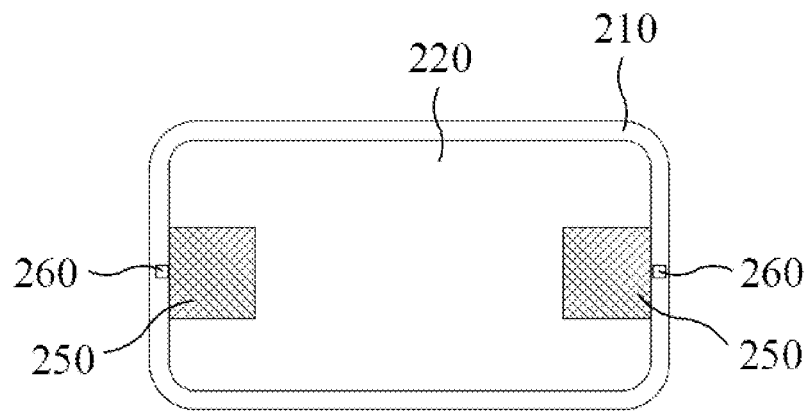
FIG. 2B is a partial top view of the display assembly shown in FIG. 2A, according to an example of the present disclosure.

FIG. 2A is a schematic diagram of a display assembly in another related art. FIG. 2B is a partial top view of the display assembly shown in FIG. 2A.

As shown in FIGS. 2A and 2B, the display assembly includes a middle frame 210, and a display screen mounted on the middle frame 210. The display screen includes a glass cover plate 220 and a display assembly 230. Two pressure sensing components 260 are provided between the middle frame 210 and the display assembly 230 at the upper and lower ends of the middle frame 210. The pressure sensing components 260 form a sensing area 250 on the display screen. When a finger presses the sensing area 250 on the display screen, the pressure sensing components 260 sense a pressing force. At this time, a pressure signal is generated to trigger the display screen to light up to wake up the display screen.

Figure 3A:
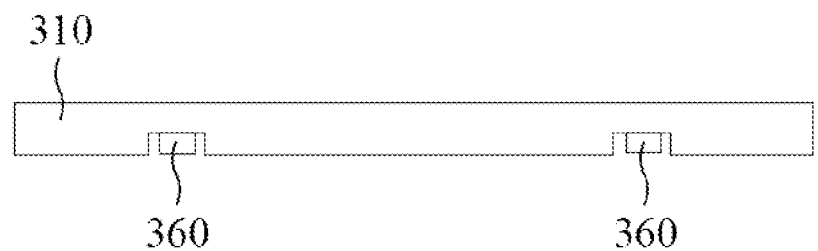
FIG. 3A is a schematic diagram of a display assembly in yet another related art, according to an example of the present disclosure.
Figure 3B:
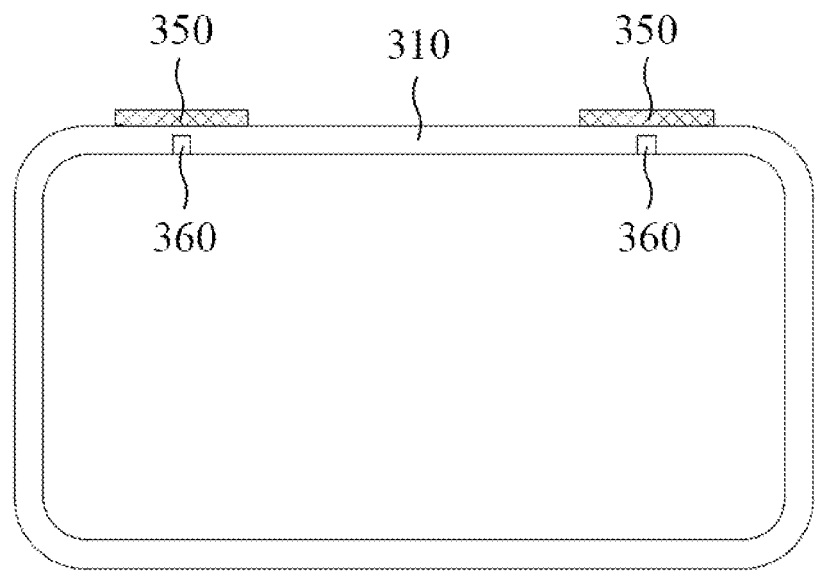
FIG. 3B is a partial top view of the display assembly shown in FIG. 3A, according to an example of the present disclosure.

FIG. 3A is a schematic diagram of a display assembly in yet another related art. FIG. 3B is a partial top view of the display assembly shown in FIG. 3A.

As shown in FIGS. 3A and 3B, the display assembly includes a middle frame 310, and a display screen mounted on the middle frame 310. A pressure sensing component 360 is provided inside the middle frame 310. The pressure sensing component 360 forms a sensing area 350 on a side of the middle frame 310. When a finger presses the sensing area 350 on the display screen, the pressure sensing component 360 senses the pressure. At this time, a pressure signal is generated to trigger the display screen to light up to wake up the display screen.

In the above display assembly, a surface of the pressure sensing component is in contact with the flat surface of the middle frame, and another surface of the pressure sensing component is in contact with the flat surface of the display screen, to replace the mechanical buttons, thereby realizing the effect of pressing and clicking on the flat surface. The pressure sensing component is in contact with a flat surface, which can only achieve contact by the flat surface and has certain limitations. For a curved screen having a curved surface, a pressure sensitive effect on the curved surface is also required.

In view of the above problems, the present disclosure provides a pressure sensitive assembly that can achieve a pressure sensitive effect on a large area of a curved surface, and overcome the limitation that in the related art, a display screen can only achieve a pressure sensing on a flat surface.

Figure 4:
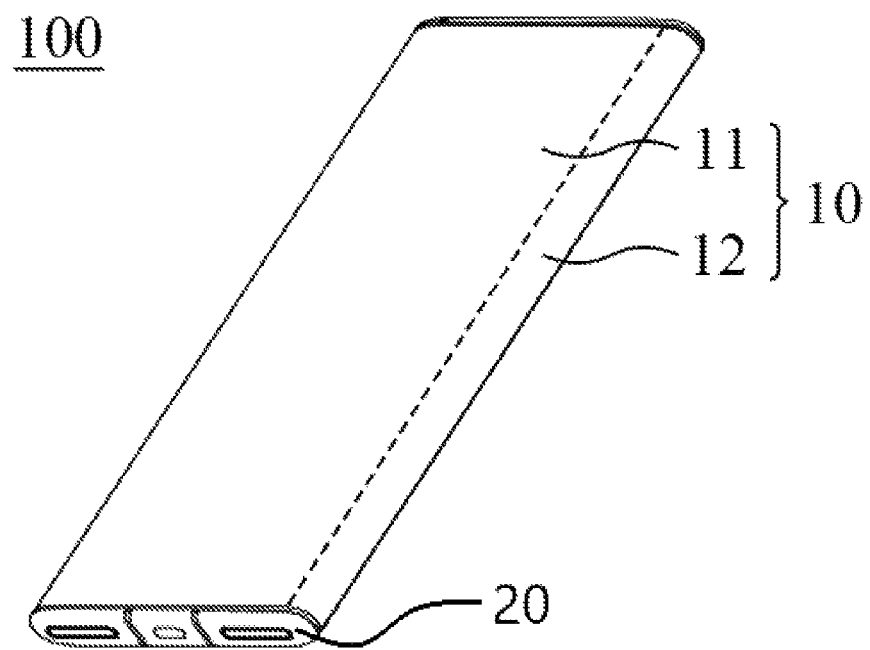
FIG. 4 is a schematic diagram of a terminal according to an example of the present disclosure.
Figure 5:
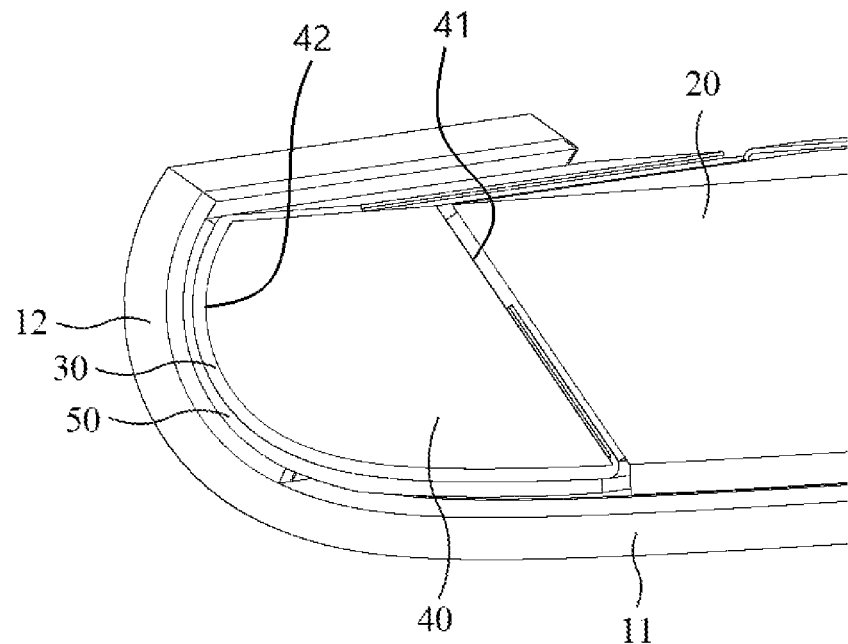
FIG. 5 is a schematic diagram of a display assembly according to an example of the present disclosure.

FIG. 4 is a schematic diagram of a terminal according to some embodiments of the present disclosure. FIG. 5 is a schematic diagram of a display assembly according to some embodiments of the present disclosure.

As shown in FIGS. 4 and 5, the pressure sensitive assembly provided in the present disclosure may be applied to a display screen 10 having a curved surface. The display screen 10 is mounted on a middle frame 20 of a terminal 100. The terminal 100 may include the middle frame 20 and the display screen 10 mounted on the middle frame 20. The terminal 100 may be a mobile phone, a tablet computer, a personal digital assistant, a notebook computer, a display, a wearable device, or the like. In the following description, a mobile phone is used as an embodiment, but the present disclosure is not limited thereto.

The middle frame 20 may be formed of a metallic material or a non-metallic material. The middle frame 20 includes an upper surface for supporting a back surface of the display screen 10, and a lower surface opposite to the upper surface and supporting components such as a fixed circuit board, a battery, and a camera. The middle frame 20 may also include a border surrounding the periphery of the upper and lower surfaces. The middle frame 20 may be used as a housing of the terminal 100 to protect components such as the display screen 10, the circuit board, the battery, and the camera.

The display screen 10 may include a flat surface 11 and a curved surface 12 extending from the flat surface 11 to at least one side. For example, the curved surface 12 may extend from the flat surface 11 to the left and right sides of the figure to form two curved surfaces 12, such that the display screen 10 forms a "waterfall screen". However, the present disclosure is not limited thereto, and the curved surface 12 may be formed by extending from the flat surface 11 to the upper side and the lower side, so that each of the four sides of the display screen 10 has a curved surface to form a "surrounding screen". Herein, the curved surface 12 may extend to the border of the middle frame 20. The curved surface 12 may also extend from the upper surface to the lower surface of the frame.

The display screen 10 may include a display assembly, and a transparent cover plate for protecting the display assembly. The transparent cover plate may be formed of a glass material such as sapphire glass, or a transparent resin material. The display assembly may be connected with the middle frame 20 by an adhesive. The display assembly includes a display panel and a protective layer. The display panel may be a flexible organic light emitting diode display panel. The protective layer may include a cushioning element (foam), a heat dissipation element (copper foil), etc.

The curved surface 12 of the display screen 10 and the middle frame 20 may form an accommodating space for accommodating the pressure sensitive assembly. The accommodating space may be a closed type or a non-closed type.

As shown in FIG. 5, a pressure sensitive assembly provided in an embodiment of the present disclosure includes a support component 40 and a pressure sensing component 30. The support component 40 includes a connection surface 41 fixedly connected with the middle frame 20, and a support surface 42 facing the curved surface 12 of the display screen 10. A pressure sensing component 30 is provided between the support surface 42 and the curved surface 12, and senses the pressing force applied to the curved surface 12. The support component 40, for example, may be a display surface or a surface made out of glass, metal or plastic. The pressure sensing component 30, for example, may be a pressure sensing circuit.

The pressure sensing component 30 is electrically connected with a control circuit inside the terminal, and the control circuit is connected with a processor. When the pressure sensing component 30 senses the pressing force on the curved surface 12, the processor performs a corresponding operation according to the received control signal. Thus, the pressure sensitive assembly of the present disclosure achieves the pressure sensitive effect on the curved surface 12 by sensing the pressing force from the curved surface 12. Further, the pressure sensitive effect on the curved surface 12 can replace the functions of some mechanical buttons, such as waking up the display screen 10, acting as an opening key of the terminal 100, and acting as a volume up/down button.

The technical solution provided in the embodiments of the present disclosure may include the following beneficial effects. In the pressure sensitive assembly of the present disclosure, the support component 40 is provided to support the pressure sensing component 30, so that the pressure sensing component 30 can be disposed on the curved surface 12 to sense the pressure from the curved surface 12, thereby achieving the pressure sensitive effect on the curved surface, and overcoming the limitations in the related art that the pressure sensing component can only be disposed on a flat surface (for example, the flat surface 11 of the display screen).

In some embodiments, pressure sensing components 30 may extend along a length direction of the curved surface 12 and are spaced apart from each other, i.e., a plurality of pressure sensing components 30 may be disposed along the length direction of the curved surface 12, and located at multiple locations along the length direction of the curved surface 12. By providing the plurality of pressure sensing component 30, the pressure can be sensed at different positions, thereby realizing different functions. For example, there are two pressure sensing components 30, which are located close to two ends in the length direction of the curved surface 12, i.e., close to the top end and the low end of the terminal respectively, which can realize the function of waking up. In some application scenarios, when the terminal is horizontally used by a user, the pressure sensing components 30 at the two ends can be conveniently operated. The plurality of pressure sensing components 30 extend along the length direction of the curved surface 12 and are spaced apart from each other, so that the pressure sensing components 30 can be used as multiple hidden virtual keys, thereby reducing the openings on the middle frame for installing mechanical buttons, and improving sealing and waterproof performance of the terminal device. Multiple hidden virtual keys can improve the interaction ability of the interface of the display screen.

In another embodiment, the pressure sensing component 30 may also extend continuously along the length direction of the curved surface 12. That is, one pressure sensing component 30 having a certain length may be disposed along the length direction of the curved surface 12. The continuous pressure sensing component 30 may increase the press sensing area of the curved surface 12, thereby facilitating user operation and providing more possibilities for interaction between the curved surface 12 and the interface of the display screen. For example, the continuous pressure sensing component 30 may be used as a volume adjustment key, i.e., pressing and sliding in the length direction of the curved surface 12 to adjust the volume level. Alternatively, the pressure sensing component 30 is used as a brightness adjustment key of the display screen, that is, the brightness of the display screen is adjusted by pressing and sliding in the length direction of the curved surface 12.

In an embodiment, when the display screen 10 is provided with a plurality of curved surfaces 12 extending from the periphery of the flat surface 11, pressure sensitive assemblies provided by the present disclosure may be provided between each curved surface 12 and the middle frame 20, to replace more mechanical buttons, and to enhance the interaction capability of the plurality of curved surfaces 12.

In an embodiment, as shown in FIG. 5, the support surface 42 of the support component 40 is an arc-shaped surface, and the shape of the support surface 42 matches the shape of the curved surface 12. The pressure sensing component 30 has an arc shape, a surface of the pressure sensing component 30 is in contact with the supporting surface 42, and another surface of the pressure sensing component 30 can be in contact with the curved surface 12 using an adhesive 50.

In the implementation, the support surface 42 of the support component 40 is first made to form an arc-shaped surface having the same curvature as the curved surface 12, and then one surface of the arc-shaped pressure sensing component 30 is in contact with the arc-shaped support surface 42 by the adhesive. Then the support component 40 together with the pressure sensing component 30 is attached to the back surface of the curved surface 12 by the adhesive for fixing, and then in contact with the middle frame 20 through the connection surface 41 of the support component 40. The support component 40 may be a support block made of rubber material. The pressure sensing component 30 may be an ultra-thin pressure sensitive panel, or a flexible pressure sensor.

The arc-shaped pressure sensing component 30 is supported by the arc-shaped support surface 42, the shape of which matches the shape of the curved surface 12, so that the pressure sensing component 30 can be in close contact with the curved surface 12, and the pressing force from the curved surface 12 can be more accurately sensed, so that the operation corresponding to the key is more accurately performed by the control unit.

Figure 6:
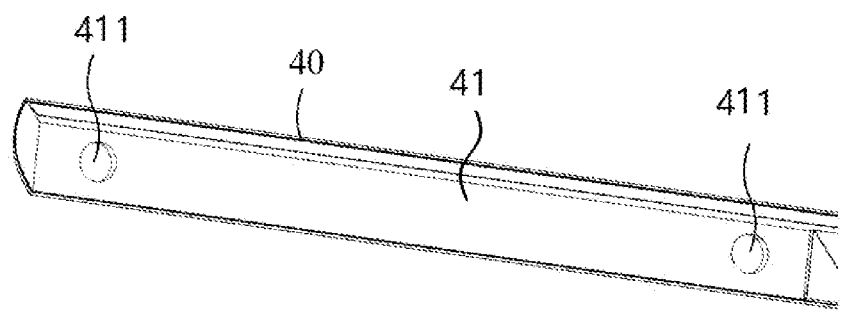
FIG. 6 is a schematic diagram of a support component of FIG. 5 according to an example of the present disclosure.
Figure 7:
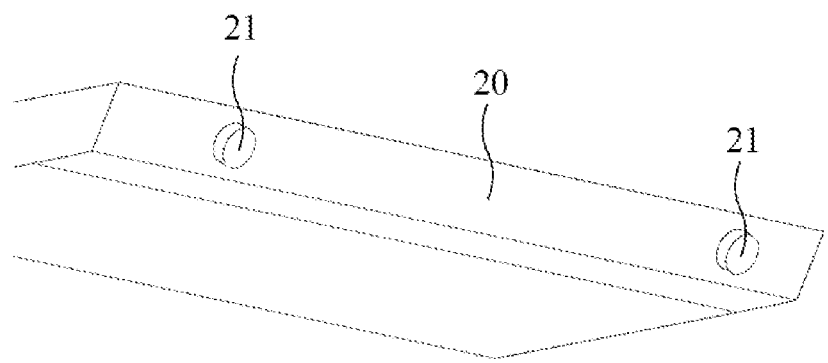
FIG. 7 is a schematic diagram of a middle frame of FIG. 5 according to an example of the present disclosure.

In an embodiment, FIG. 6 is a schematic diagram of the support component of FIG. 5 according to some embodiments of the present disclosure. FIG. 7 is a schematic diagram of the middle frame of FIG. 5 according to some embodiments of the present disclosure.

As shown in FIGS. 6 and 7, the connection surface 41 of the support component 40 is provided with a first positioning part 411, and the middle frame 20 is provided with a second positioning part 21 corresponding to the first positioning part 411. When the connection surface 41 is fixedly connected with the middle frame 20, the connection surface 41 and the middle frame 20 are positioned by the first positioning part 411 and the second positioning part 21.

The positioning parts are provided on the connection surface 41 of the support component 40 and the middle frame 20, and the connection surface 41 is in contact with the middle frame 20 after the connection surface 41 and the middle frame 20 are positioned by the positioning parts. In this way, the support component 40 can be effectively prevented from being offset, and thus the pressure sensing component 30 in contact with the support surface 42 can be prevented from being offset relative to the curved surface 12. Therefore, the pressure sensing component 30 can be brought into close contact with the curved surface 12, to ensure the accuracy of the pressure sensing from the curved surface 12.

In an embodiment, the first positioning part 411 is a positioning hole, and the second positioning part 21 is a positioning post corresponding to the positioning hole. That is, a positioning hole is provided on the connection surface 41, and a positioning post corresponding to the positioning hole is provided on the middle frame 20. When the connection surface 41 of the support component 40 is in contact with the middle frame 20, the positioning post is inserted into the positioning hole for positioning, thereby preventing the offset of the pressure sensing component 30 with respect to the curved surface 12.

In addition, two positioning holes and two positioning posts may be provided, and one of the two positioning holes is provided at an end of the connection surface 41 and the other one of the two positioning holes is provided at another end of the connection surface 41. Two positioning posts are provided on the middle frame 20 corresponding to the positioning holes. When the connection surface 41 of the support component 40 is in contact with the middle frame 20, the rotation of the support component 40 is prevented by the two positioning holes and the two positioning posts, to prevent an angular offset of the pressure sensing component 30 in the thickness direction of the terminal 100.

In another embodiment, the first positioning part 411 is a positioning post, and the second positioning part 21 is a positioning hole corresponding to the positioning post. That is, the positioning post is provided on the connection surface 41, and the positioning hole corresponding to the positioning post is provided on the middle frame 20.

In another embodiment, the first positioning part 411 may be a slot structure, and the slot structure may be, for example, wedge-shaped, T-shaped, or dovetail-shaped. The second positioning part 21 may be a block structure corresponding to the positioning slot, and the block structure may be, for example, wedge-shaped, T-shaped, or dovetail-shaped. When the connection surface 41 of the support component 40 is connected with the middle frame 20, the block structure is embedded into the positioning slot for positioning, so that the pressure sensing component 30 is prevented from being offset with respect to the curved surface 12. The support component 40 is brought into close contact with the middle frame by embedding the block into the slot, which can omit the step of dispensing glue and facilitate installation and disassembly.

Figure 8:
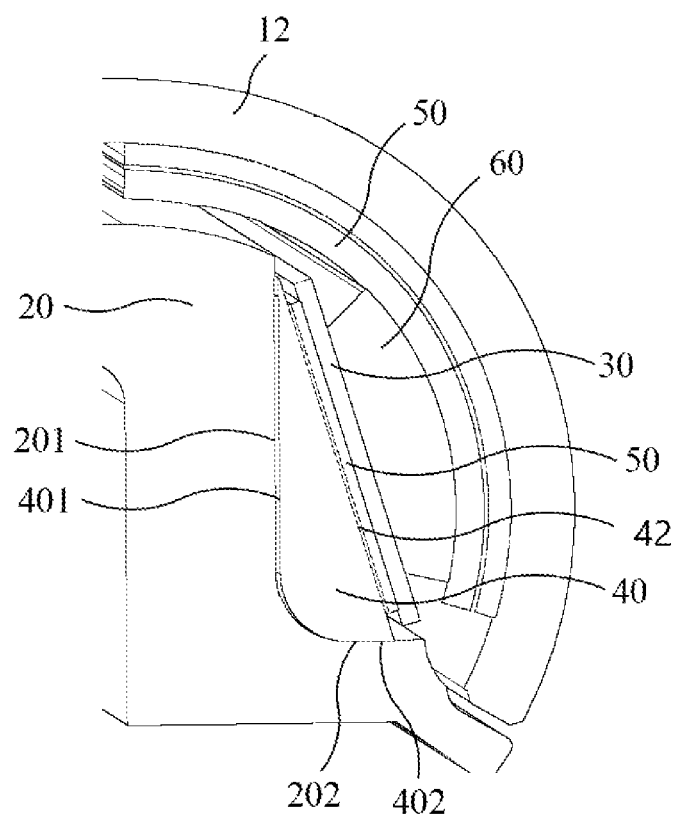
FIG. 8 is a schematic diagram of a display assembly according to an example of the present disclosure.
Figure 9:
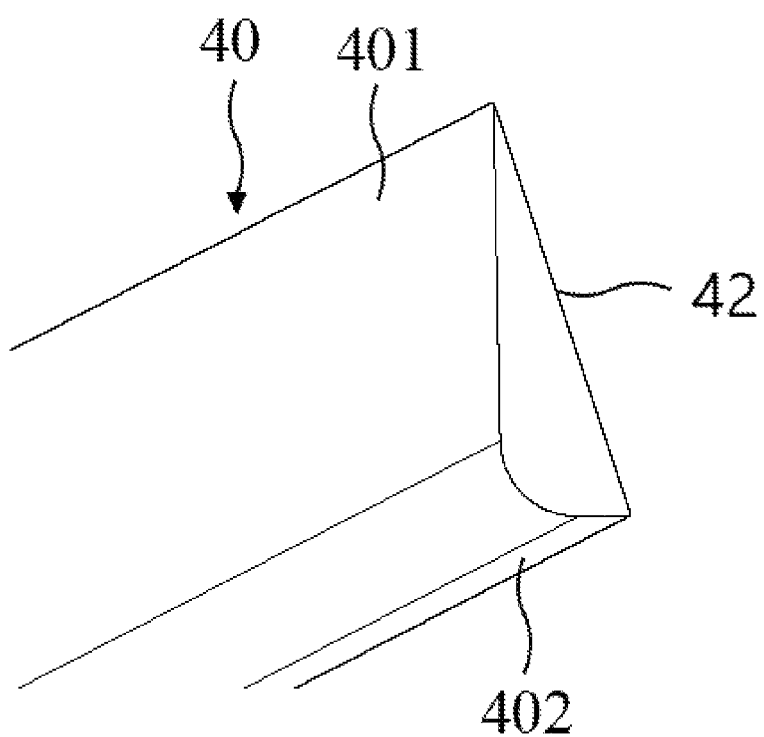
FIG. 9 is a schematic diagram of a support component of FIG. 8 according to an example of the present disclosure.

In an embodiment, FIG. 8 is a schematic diagram of a display assembly according to another exemplary embodiment of the present disclosure. FIG. 9 is a schematic diagram of the support component of FIG. 8 according to some embodiments of the present disclosure. As shown in FIGS. 8 and 9, the pressure sensitive assembly further includes an elastic component 60 disposed between the pressure sensing component 30 and the curved surface 12. The pressure sensing component 30 senses the pressing force from the curved surface 12 through the elastic component 60, the pressing force from the curved surface 12 is transmitted to the elastic component 60, and the pressure sensing component 30 senses the pressure generated by the deformation of the elastic component 60. The elastic component 60 may be foam or rubber.

In an embodiment, the support surface 42 of the support component 40 is a flat surface. A surface of the pressure sensing component 30 is in contact with the support surface 42, and another surface of the pressure sensing component 30 is in contact with the elastic component 60. When the elastic component is pressed, the elastic component 60 is formed with a first surface and a second surface. The first surface is an arc-shaped surface, and the shape of the first surface matches the shape of the curved surface 12. The second surface is a flat surface, and in contact with the pressure sensing component 30.

In the implementation, the support surface 42 of the support component 40 is first made to be a flat surface as a support, and then a surface of the pressure sensing component 30 is in contact with the support plane by an adhesive. Then another surface of the pressure sensing component 30 is in contact with the elastic component 60 by an adhesive, and then the support component 40 is fixed to the middle frame 20 by the connection surface of the support component 40. Then the display screen 10 is mounted on the middle frame 20, so that the curved surface 12 is in contact with an arc-shaped surface of the elastic component 60.

When the elastic component is pressed, the elastic component 60 is in close contact with the curved surface 12 by bringing the arc-shaped surface, matching the shape of the curved surface 12, of the elastic component 60 into contact with the curved surface 12. The pressure sensing component 30 indirectly senses the pressing force from the curved surface 12 by the elastic component 60, replacing the arc-shaped support surface 42 of the support component 40 in FIG. 5 with the elastic component 60, so that the manufacturing of the supporting component 40 is more convenient and the cost is reduced. At the same time, there is no need to bend the pressure sensing component 30 to form an arc shape. That is, the pressure sensing component 30 and the supporting component 40 are in contact with each other by a flat surface. In this case, there is no need to overcome the tension caused by the bending of the pressure sensing component 30, and the pressure sensing component 30 and the supporting component 40 are in contact with each other more conveniently and firmly.

In an embodiment, the middle frame 20 includes a first fixing surface 201 facing the curved surface 12, and a second fixing surface 202 successively connected with the first fixing surface 201. The support component 40 includes a first connection surface 401 and a second connection surface 402, and the second connection surface 402 is successively connected with the first connection surface 401. The shape of the first connection surface 401 matches the shape of the first fixing surface 201, and the shape of the second connection surface 402 matches the shape of the second fixing surface 202. The first connection surface 401 is in contact with the first fixing surface 201, and the second connection surface 402 is in contact with the second fixing surface 202. The first connection surface 401 may be perpendicular to the second connection surface 402, and accordingly the first fixing surface 201 may be perpendicular to the second fixing surface 202.

The support component 40 is fixed to the two fixing surfaces of the middle frame 20 by two connection surfaces, respectively, so that the positioning of the pressure sensing component 30 on the support component 40 is more accurate, the offset of the support component 40 can be prevented more effectively, and the accuracy of the sensing of the pressure sensing component 30 can be further improved.

In an embodiment, each of the first fixing surface 201, the second fixing surface 202, the first connection surface 401, and the second connection surface 402 is a flat surface. The first fixing surface 201, the second fixing surface 202, the first connection surface 401, and the second connection surface 402, which are flat surfaces, are easy to manufacture and are easy to be in contact with each other. However, the present disclosure is not limited thereto, and each of the first fixing surface 201, the second fixing surface 202, the first connection surface 401, and the second connection surface 402 may be a curved surface or have an irregular shape.

In addition, each of the first fixing surface 201, the second fixing surface 202, the first connection surface 401, and the second connection surface 402 may be provided with a positioning structure or a snap structure. For example, each of the first fixing surface 201 and the second fixing surface 202 is provided with a positioning hole, and each of the first connection surface 401 and the second connection surface 402 is provided with a positioning post corresponding to the positioning hole. Alternatively, each of the first fixing surface 201 and the second fixing surface 202 is provided with a slot, and each of the first connecting surface 401 and the second connecting surface 402 is provided with a buckle corresponding to the slot. The slot and the buckle may be wedge-shaped, T-shaped, dovetail-shaped.

According to a second aspect of the embodiments of the present disclosure, a middle frame assembly is provided, including the middle frame and the pressure sensitive assembly of any of the embodiments of the first aspect described above.

The middle frame 20 supports the display screen 10. The display screen 10 includes a flat surface 11 and a curved surface 12 extending from the flat surface 11, and the pressure sensitive assembly is disposed on the curved surface 12 and fixedly connected with the middle frame 20.

The middle frame assembly according to the embodiment of the present disclosure can realize the pressure sensitive effect on the curved surface 12 of the display screen 10 mounted on the middle frame 20, and provides more possibilities for the interaction with the picture of the display screen.

According to a third aspect of the disclosed embodiment, a display assembly is provided, including a display screen 10 and a middle frame assembly as described in the second aspect. At least one side of the display screen 10 is formed with a curved surface 12.

The display screen 10 may include a glass cover plate, a display panel located below the glass cover plate, and a protective layer in contact with the back surface of the display panel. The display panel may be a flexible organic light emitting diode display panel including a flat surface and a curved surface.

The curved surface 12 may extend from the flat surface 11 to the left and right sides of the figure to form two curved surfaces 12, such that the display screen 10 forms a "waterfall screen". In another example, the curved surface 12 may also be a curved surface extending from the flat surface 11 to the upper and lower sides, such that each of the four sides of the display screen 10 has a curved surface to form a "surrounding screen". Here, the curved surface 12 may extend to the border of the middle frame 20. The curved surface 12 may also extend from the upper surface to the lower surface of the frame.

By the display assembly in the embodiment of the present disclosure, the pressure sensitive effect on the curved surface can be realized, and the sensing on the large-area curved surface can be realized, so that operation is facilitated, and user experience is increased.

According to a fourth aspect of the disclosed embodiment, a terminal 100 is provided, including a terminal body and a display assembly according to the third aspect. The display assembly is disposed on the terminal body. The terminal 100 may include a middle frame 20 and a display screen 10 mounted on the middle frame 20. The terminal 100 may be a mobile phone, a tablet computer, a personal digital assistant, a notebook computer, a display, a wearable device, or the like.

The terminal 100 according to the embodiment of the present disclosure can realize the pressure sensitive effect on the curved surface of the curved screen, and overcomes the limitation in the related art that the pressure sensing can only be realized on the flat surface of the display screen. The pressure sensitive effect on the curved surface enables the large-sized curved surface sensing area to be realized, providing more possibilities for interaction with the picture of the display screen.

It will be understood that the terminal provided in the embodiments of the present disclosure, in order to implement the above functions, includes a hardware structure and/or a software assembly for performing each function. The disclosed embodiments can be implemented in hardware or a combination of hardware and computer software in combination with the elements and algorithm steps of the examples disclosed in the disclosed embodiments. Whether a particular function is performed in hardware or computer software-driven hardware depends on the particular application and design constraints of the solution. Those skilled in the art may use different methods to implement the described functions for each particular application, but such implementation should not be considered to be beyond the scope of the technical solutions of the disclosed embodiments.

It is to be understood that "a plurality of" in the present disclosure refers to two or more, with other quantifiers being similar. "And/or" describing the association relationship of the associated object, indicating that there may be three relationships. For example, A and/or B may indicate that there is A alone, or there are both A and B, or there is B alone. The character "/" generally indicates that the associated object is an "or" relationship. The singular forms "a", "an", and "the" are also intended to include the plural unless the context clearly indicates otherwise.

It is further understood that the terms "first," "second," and the like are used to describe various information, but such information should not be limited to these terms. These terms are used merely to distinguish the same type of information from one another and do not denote a particular order or degree of importance. Indeed, the expressions "first", "second", and the like are used interchangeably at all. For example, the first information may also be referred to as second information without departing from the scope of the present disclosure, and similarly, the second information may also be referred to as first information.

It is further understood that the azimuth or positional relationship indicated by the terms "center," "longitudinal," "transverse," "front," "rear," "upper," "lower," "left," "right," "vertical," "horizontal," "top," "bottom," "inner," "outer," and the like, is based on the azimuth or positional relationship shown in the drawings, merely to facilitate the description of the embodiments and the simplified description, and not to indicate or imply that the devices or elements referred to must have, be constructed and operated with, a particular azimuth.

It will be further understood that unless specifically stated otherwise, "connection" includes a direct connection without the presence of other elements between the two, as well as an indirect connection with the presence of other elements between the two.

It is further to be understood that while operations are described in a particular order in the drawings in the embodiments of the present disclosure, this should not be construed as requiring such operations be performed in the particular order shown or in a serial order, or that all of the operations shown are required to be performed to achieve the desired results. Multitasking and parallel processing may be advantageous in a particular environment.

Other embodiments of the present disclosure will readily come to the mind of those skilled in the art upon consideration of the specification and practice of the invention disclosed herein. This application is intended to cover any variations, uses, or adaptations of the present disclosure that follow the general principles of the present disclosure and include common general knowledge or customary technical means in the art that are not disclosed in the present disclosure. The specification and examples are to be regarded as exemplary only, and the true scope and spirit of the present disclosure are pointed out by the following claims.

It is to be understood that the present disclosure is not limited to the precise structures already described above and illustrated in the accompanying drawings, and that various modifications and changes may be made without departing from the scope thereof. The scope of the present disclosure is limited only by the appended claims.

What is claimed is:

1. A pressure sensitive assembly for a display screen comprising:
    a support component comprising a connection surface and a support surface, wherein the connection surface is fixedly coupled with a middle frame, and the support surface is disposed facing a curved surface, wherein the display screen comprises the curved surface and is mounted on the middle frame;
    at least one pressure sensing circuit disposed between the support surface and the curved surface, wherein the at least one pressure sensing circuit senses a pressing force applied to the curved surface; and
    an elastic component disposed between the curved surface and the at least one pressure sensing circuit, wherein the at least one pressure sensing circuit senses the pressing force applied to the curved surface through a deformation of the elastic component,
    wherein the support surface is a flat surface,
    a surface of the at least one pressure sensing circuit is in contact with the support surface, and another surface of the at least one pressure sensing circuit is in contact with the elastic component,
    the elastic component comprises a first surface and a second surface in response to the elastic component being pressed, wherein the first surface is an arc-shaped surface, and a shape of the first surface matches a shape of the curved surface; and the second surface is a flat surface, and in contact with the at least one pressure sensing circuit.

2. The pressure sensitive assembly of claim 1, wherein the middle frame comprises a first fixing surface facing the curved surface, and a second fixing surface successively coupled with the first fixing surface,
    the support component comprises a first connection surface, and a second connection surface successively coupled with the first connection surface,
    wherein a shape of the first connection surface matches that of the first fixing surface, a shape of the second connection surface matches that of the second fixing surface, the first connection surface is in contact with the first fixing surface, and the second connection surface is in contact with the second fixing surface.

3. The pressure sensitive assembly of claim 2, wherein each of the first fixing surface, the second fixing surface, the first connection surface and the second connection surface is a flat surface.

4. The pressure sensitive assembly of claim 1, wherein the pressure sensitive assembly comprises a pressure sensing circuit extending along a length direction of the curved surface, or the pressure sensitive assembly comprises a plurality of pressure sensing circuits extending along a length direction of the curved surface and spaced apart from each other.

5. A middle frame assembly, comprising:
    a middle frame for supporting a display screen, wherein the display screen comprises a curved surface; and
    a pressure sensitive assembly comprising:
    a support component comprising a connection surface and a support surface, wherein the connection surface is fixedly coupled with the middle frame, and the support surface is disposed facing the curved surface;
    at least one pressure sensing circuit disposed between the support surface and the curved surface, wherein the at least one pressure sensing circuit senses a pressing force applied to the curved surface; and
    an elastic component disposed between the curved surface and the at least one pressure sensing circuit, wherein the at least one pressure sensing circuit senses the pressing force applied to the curved surface through a deformation of the elastic component,
    wherein the pressure sensitive assembly is disposed on the curved surface and fixedly coupled with the middle frame,
    wherein the support surface is a flat surface,
    a surface of the at least one pressure sensing circuit is in contact with the support surface, and another surface of the at least one pressure sensing circuit is in contact with the elastic component,
    the elastic component comprises a first surface and a second surface in response to the elastic component being pressed, wherein the first surface is an arc-shaped surface, and a shape of the first surface matches a shape of the curved surface; and the second surface is a flat surface, and in contact with the at least one pressure sensing circuit.

6. A display assembly, comprising:
    a display screen; and
    a middle frame assembly comprising:
    a middle frame for supporting the display screen, wherein the display screen comprises a curved surface; and
    a pressure sensitive assembly comprising:
    a support component comprising a connection surface and a support surface, wherein the connection surface is fixedly coupled with the middle frame, and the support surface is disposed facing the curved surface;
    at least one pressure sensing circuit disposed between the support surface and the curved surface, wherein the at least one pressure sensing circuit senses a pressing force applied to the curved surface; and
    an elastic component disposed between the curved surface and the at least one pressure sensing circuit, wherein the at least one pressure sensing circuit senses the pressing force applied to the curved surface through a deformation of the elastic component,
    wherein the pressure sensitive assembly is disposed on the curved surface and fixedly coupled with the middle frame,
    wherein the support surface is a flat surface,
    a surface of the at least one pressure sensing circuit is in contact with the support surface, and another surface of the at least one pressure sensing circuit is in contact with the elastic component, the elastic component comprises a first surface and a second surface in response to the elastic component being pressed, wherein the first surface is an arc-shaped surface, and a shape of the first surface matches a shape of the curved surface; and the second surface is a flat surface, and in contact with the at least one pressure sensing circuit.

7. The display assembly of claim 6, wherein at least one side of the display screen is formed with the curved surface.

* * * * *